United States Patent
Gopal et al.

(10) Patent No.: US 8,671,406 B1
(45) Date of Patent: Mar. 11, 2014

(54) METHOD AND SYSTEM FOR PROVIDING STORAGE SERVICES

(75) Inventors: Mohandas Gopal, Pleasanton, CA (US);
Vineeth Karinta, Fremont, CA (US);
Anagha Barve, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 396 days.

(21) Appl. No.: 13/096,959

(22) Filed: Apr. 28, 2011

(51) Int. Cl.
*G06F 9/455* (2006.01)

(52) U.S. Cl.
USPC .............................................. 718/1

(58) Field of Classification Search
None
See application file for complete search history.

(56) References Cited

U.S. PATENT DOCUMENTS

| | | | | |
|---|---|---|---|---|
| 8,464,250 | B1* | 6/2013 | Ansel | 718/1 |
| 2005/0246397 | A1* | 11/2005 | Edwards et al. | 707/204 |
| 2008/0271017 | A1* | 10/2008 | Herington | 718/1 |
| 2010/0077162 | A1* | 3/2010 | Kaneko et al. | 711/162 |
| 2010/0299309 | A1* | 11/2010 | Maki et al. | 707/640 |
| 2011/0035546 | A1* | 2/2011 | Iyoda | 711/112 |

* cited by examiner

*Primary Examiner* — Emerson Puente
*Assistant Examiner* — Sisley Kim
(74) *Attorney, Agent, or Firm* — Klein, O'Neill & Singh, LLP

(57) ABSTRACT

Method and system are provided for managing components of a storage operating environment having a plurality of virtual machines that can access a storage device managed by a storage system. The virtual machines are executed by a host platform that also executes a processor-executable host services module that interfaces with at least a processor-executable plug-in module for providing information regarding the virtual machines and assists in storage related services, for example, replicating the virtual machines.

18 Claims, 11 Drawing Sheets

METHOD AND SYSTEM FOR PROVIDING STORAGE SERVICES

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client processing systems ("clients"). The storage operating system stores and manages shared data containers in a set of mass storage devices.

Storage systems are being used extensively with virtual machines in virtual environments, which add to the complexity of a storage operating environment. As the complexity of a storage operating environment increases, so does the need for efficiently managing components within the operating environment and providing storage related services. Continuous efforts are being made to efficiently manage a storage operating environment and provide storage related services.

SUMMARY

In one embodiment, a method and system is provided for managing components at a storage operating environment having a plurality of virtual machines that can access a storage device managed by a storage system. The virtual machines are executed by a host platform that also executes a processor-executable host services module that interfaces with at least a processor-executable plug-in module for providing information regarding the virtual machines and storage related services, for example, replicating the virtual machines.

In another embodiment, a machine implemented method for managing events in a storage operating environment is provided. The method includes providing a processor-executable plug-in application that interfaces with a processor executable host services module and an operating system of a computing system executing a plurality of virtual machines; and the plug-in application maintaining a queue for storing information related to any event related to any of the plurality of virtual machines.

The method further includes determining if a virtual machine was added or removed during a certain duration; the plug-in application collecting information regarding the plurality of virtual machines in the storage operating environment; the plug-in application notifying the host services module of a change in the storage operating environment; and the plug-in application providing information regarding the virtual machines to the host services module, when requested.

In yet another embodiment, a machine implemented method for a storage operating environment having a plurality of virtual machines and a storage system managing storage space at a storage device is provided. The method includes obtaining information regarding the plurality of virtual machines operating within the storage environment; and generating a data structure for illustration of a hierarchical structure showing a virtual storage device associated with each of the plurality of virtual machines; a replicated copy of the plurality of virtual machines with a location map showing where the replicated copy is stored and a replicated copy of a storage volume generated by a storage system executed within the storage operating environment. The hierarchical structure is generated by a processor-executable plug-in application that obtains information regarding the plurality of virtual machines.

The method further includes obtaining information regarding a virtual machine from among the plurality of virtual machines, in response to a request for information, using the data structure for the hierarchical structure; and presenting the requested information on a display device.

In another embodiment, a machine implemented method for a storage operating environment having a plurality of virtual machines and a storage system managing storage space at a storage device is provided. The method includes generating a data structure for representing the plurality of virtual machines in a searchable, hierarchical structure showing a virtual storage device associated with each virtual machine; a replicated copy of each virtual machine with a location map showing a location where the replicated copy is stored; and a replicated copy of a storage volume at the storage device, generated by the storage system executed within the storage operating environment. A processor-executable plug-in application obtains information regarding the plurality of virtual machines and generates the data structure for representing the virtual machines.

The method further includes filtering virtual machine representation based on a request for information; and presenting the filtered representation on a display device.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As used in this disclosure, the terms "component", "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
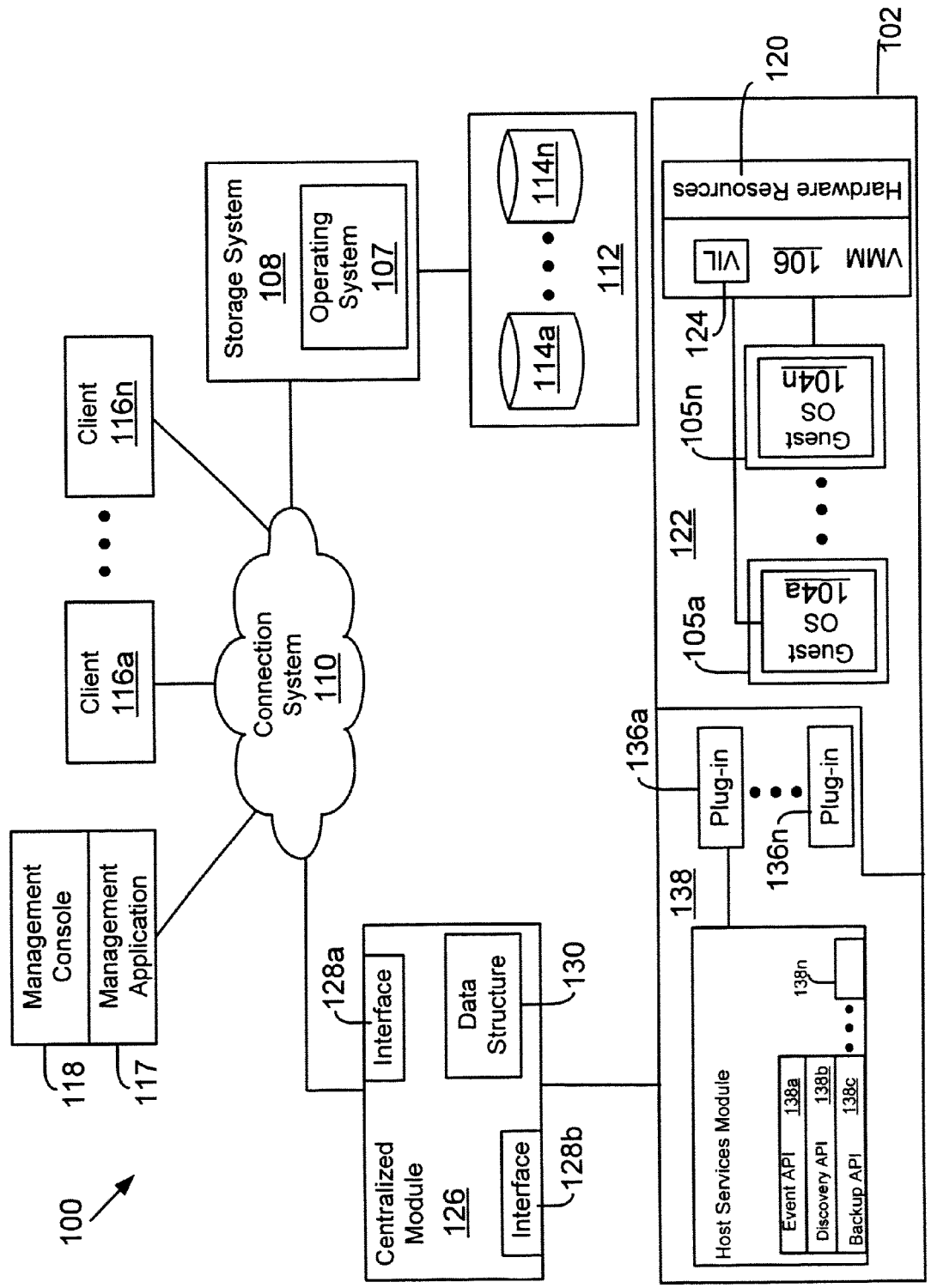
FIG. 1A shows an example of a storage operating environment using some of the various embodiments disclosed herein.

In one embodiment, a method and system is provided for managing components at a storage operating environment having a plurality of virtual machines that can access a storage device managed by a storage system. The virtual machines are executed by a host platform that also executes a processor-executable host services module that interfaces with at least a processor-executable plug-in module for providing information regarding the virtual machines and assists in storage related services, for example, replicating the virtual machines System 100:

FIG. 1A shows an example of a system 100 (may also be referred to as a storage operating environment), where the adaptive embodiments disclosed herein may be implemented. System 100 includes at least a virtual machine environment where a physical resource is time-shared among a plurality of independently operating virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one embodiment, system 100 includes at least a computing system 102 (may also be referred to as a host platform 102 and/or server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

In another embodiment, system 100 may include a cluster of host platforms 102 where computing tasks are distributed among different host platforms 102. More than one host platforms may also be used for redundancy because if one host platform fails, another host platform can take over the responsibilities/functionality of the failed host platform.

System 100 may also include a management console 118 that executes processor executable instructions, for example, a management application 117 for managing and configuring various elements of system 100. One or more client systems 116a-116n (may also be referred to as client system 116) may also be provided for generating input/output requests for reading and writing information or for any other reason.

Host platform 102, management console 118 and client system 116 may be general purpose computers having a plurality of components. As described below in more detail, these components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed random access memory (RAM) circuits.

In one embodiment, the storage system 108 has access to a set of mass storage devices 114a-114n (may be referred to as storage devices 114) within at least one storage subsystem 112. The mass storage devices 114 may include writable storage device media such as magnetic disks, video tape, optical, DVD, magnetic tape, non-volatile memory devices for example, self-encrypting drives, flash memory devices and any other similar media adapted to store information. The storage devices 114 may be organized as one or more groups of Redundant Array of Independent (or Inexpensive) Disks (RAID). The embodiments disclosed are not limited to any particular storage device or storage device configuration.

The storage system 108 provides a set of storage volumes to the host platform 102 via connection system 110. The storage operating system 107 can present or export data stored at storage devices 110 as a volume, or one or more qtree sub-volume units. Each volume may be configured to store data containers, scripts, word processing documents, executable programs and any other type of structured or unstructured data. The term data container as used herein means a block, a file, a logical unit of data or any other information. From the perspective of one of the client systems, each volume can appear to be a storage device. However, each volume can represent the storage space in one storage device, an aggregate of some or all of the storage space in multiple storage devices, a RAID group, or any other suitable set of storage space. The storage devices may be presented as a "logical unit number" (LUN) where a LUN may refer to a logical data container that looks like a storage device to a host (client) but which actually may be distributed across multiple storage devices by storage system 108.

The storage system 108 may be used to store and manage information at storage devices 114 based on a request generated by management console 118, client system 116 and/or a VM. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, the client system 116 transmits one or more input/output (I/O) commands, such as an NFS or CIFS request, over connection system 110 to the storage system 108. Storage system 108 receives the request, issues one or more I/O commands to storage devices 114 to read or write information on behalf of the client system, and issues an NFS or CIFS response containing the requested information over the network 110 to the respective client system.

Although storage system 108 is shown as a stand-alone system, i.e. a non-cluster based system, in another embodiment, storage system 108 may have a distributed architecture that may include, for example, a separate N-("network") blade and D-(disk) blade. Briefly, the N-blade is used to communicate with host platform 102 and clients 116, while the D-blade is used to communicate with the storage devices 114 that are a part of a storage sub-system. The N-blade and D-blade may communicate with each other using an internal protocol.

Alternatively, storage system 108 may have an integrated architecture, where the network and data components are all contained in a single box. The storage system 108 further may be coupled through a switching fabric to other similar storage systems (not shown) which have their own local storage subsystems. In this way, all of the storage subsystems can form a single storage pool, to which any client of any of the storage servers has access.

Information stored at storage devices 114 is typically replicated (or backed up) at one or more storage locations (not shown). A backup of a data container or a file system includes copying and storage of a directory and/or tree structure of the file system. A processor executable backup process may use image taking technology (e.g., the Snapshot™ technology provided by NetApp Inc. of Sunnyvale, Calif.) (without derogation of trademark rights of NetApp Inc.) to backup all or a portion of the file system. The image(s) can be used later during a restore process.

A snapshot is a persistent point in time (PPT) image of the active file system that enables quick recovery of information after information has been corrupted, lost, altered. Snapshots can be created by copying the data at each predetermined point in time to form a consistent image. The terms snapshot and backup are used interchangeably throughout this specification. It is noteworthy that the adaptive embodiments described herein are not limited to using any particular imaging technology.

In some embodiments, the backup process produces backup information that may include metadata that is stored by storage system 108. The backup information includes information describing the backup performed on the file system (e.g., a time stamp, data container names, and/or location information). The backup information and images are used later to restore the imaged file system or a portion thereof.

A restore operation using the metadata may be performed for a variety of reasons. For example, a restore operation may be performed when an error occurs in the file system, in an application, in the server or storage operating system, or in the other applications that causes a "crash" and reboot of the server system or the storage system. A restore may be performed when data in the file system have been undesirably altered, corrupted, and/or deleted, for example, by a computer virus or other malignant code. If a data container has undesirably become altered, corrupted, and/or deleted, it is advantageously restored by copying and/or replacing it by using a previously stored image thereof.

The restore process is configured to restore part of the file system. The restore process retrieves the backup information and/or image(s) for the part of the file system. The restore process then restores the part of the file system by using the backup information and/or images. The restore process may do so by deleting and replacing data containers of the file system with data containers from the backup images. Alternatively, the set of original data containers may have been deleted and does not exist and thus are replaced by the retrieved backup information and images. Backup operations using the various modules of FIG. 1A are described below in more detail.

Referring back to FIG. 1A, host platform 102 may also include a processor executable virtual execution environment 122. The virtual execution environment 122 may include a plurality of VMs 105a-105n executing a plurality of guest OS 104a-104n (may also be referred to as guest OS 104) that share hardware resources 120. As described above, hardware resources 120 may include CPU, memory, I/O devices, storage or any other hardware resource.

In one embodiment, host platform 102 may also include a virtual machine monitor (VMM) (for example, Hyper-V layer provided by Microsoft Corporation (without derogation of any trademark rights owned by Microsoft Corporation), a processor executed hypervisor layer provided by VMWare Inc. (without derogation of any trademark rights owned by VMWare Inc.), or any other type of VMM) 106. VMM 106 presents and manages the plurality of VMs 105a-105n executed by the host platform. The VMM 106 may include or interface with a virtualization layer (VL—shown as VIL in figures) 124 that provides one or more virtualized hardware resource to each guest OS 104a-104n.

In one embodiment, VMM 106 is executed by host platform 102. In another embodiment, VMM 106 may be executed by an independent stand-alone computing system, often referred to as a hypervisor server or a VMM server. It is noteworthy that various vendors provide virtualization environments, for example, VMware Inc., Microsoft Corporation and others. The generic virtualization environment described above with respect to FIG. 1A may be customized depending on the virtual environment provider.

In one embodiment, system 100 also includes a centralized module 126 that maintains a data structure 130 for providing and assisting in various storage related services, as described below in more detail. In one embodiment, the centralized module 126 may use an interface 128a to interface with management console 118 and client system 116 via connection system 110. Interface 128b is used to communicate with host services module 138 that is described below in more detail. The structure and logic used by interface 128a will depend on a protocol/standard that is used to communicate with connection system 110. For example, if connection system 110 uses an Ethernet connection, then interface 128a will include the logic and circuitry for handling Ethernet based communication. Furthermore, although separate interface 128a and 128b have been shown, a single interface may be used to communicate with both connection system 110 and host services module 138.

The host services module 138 may include a plurality of processor executable host services application programming interface (APIs) 138a-138n, according to one embodiment. The host services APIs are designed to interface with a plurality of processor executable plug-in applications 136a-136n (also referred to as plug-ins 136a-136n). The APIs are used for certain operations/functionality, as described below. The plug-in applications are used to assist or perform certain functions that are also described below in more detail. The plug-in applications 136a-136n may be used to interface with various modules, for example, the VMM 106, host services module 138, storage system 108 and others.

Figure 1B:
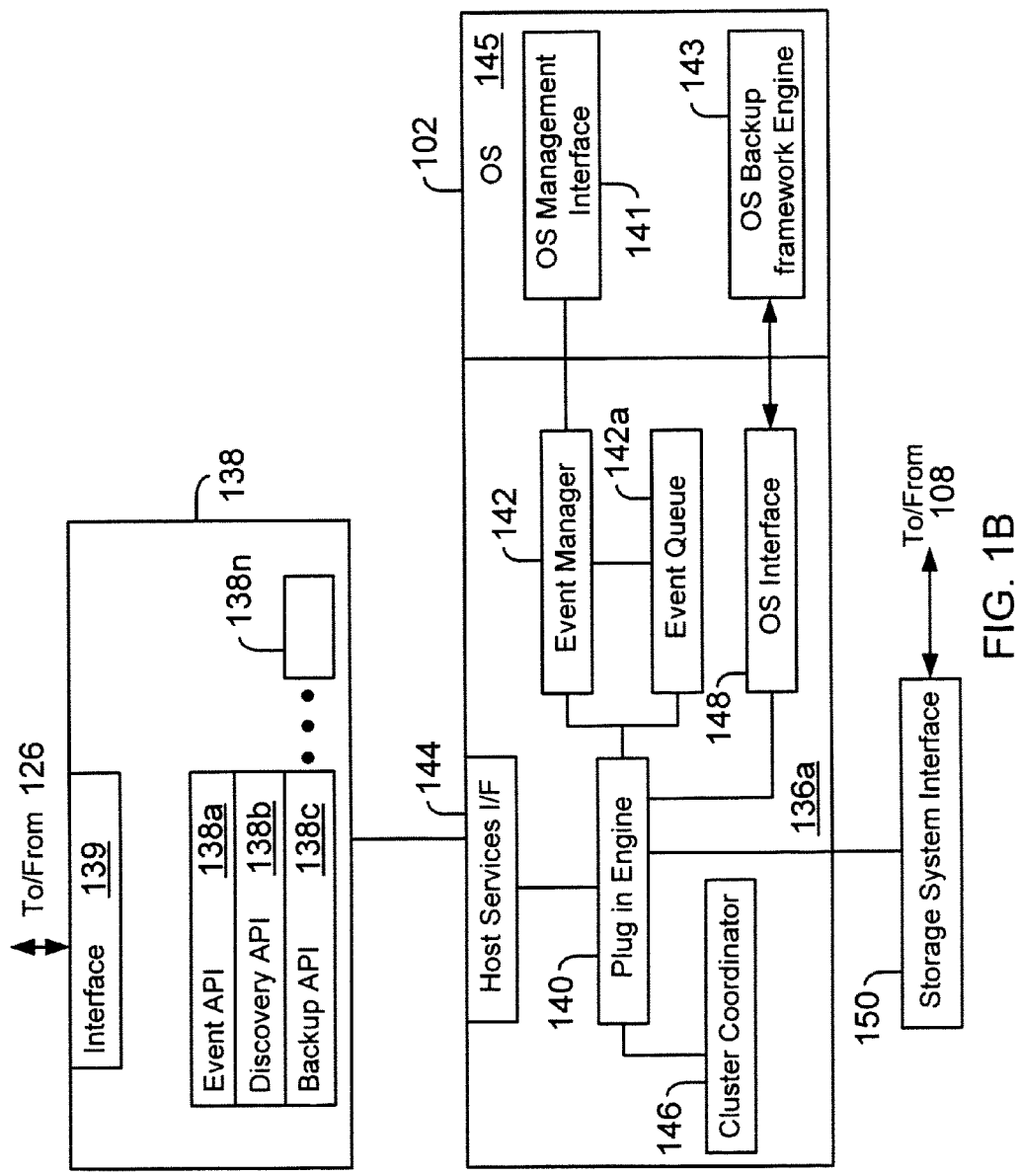
FIG. 1B shows an example of an architecture used in the storage environment of FIG. 1A, according to one embodiment.

FIG. 1B shows a block diagram of a plug-in 136a (may also be referred to as Hyper-V Plug-in) that is used in system 100, according to one embodiment. Plug-in 136a includes a plug-in engine 140 that co-ordinates and controls the overall functionality of plug-in 136a. Plug-in engine 140 includes machine implemented (i.e. processor/CPU executable) instructions for executing process steps that are described below in more detail.

Plug-in 136a interfaces with host services module 138 via a host services interface 144. The host services module 138 interfaces with the centralized module 126 via an interface 139. The host services module 138 may include a plurality of processor executable APIs 138a-138n, for example, an event API 138a, a discovery API 138b, a backup API 138c and others. The functionality of the various APIs is described below in more detail.

In one embodiment, plug-in 136a interfaces with the operating system 145 of host platform 102 via an operating system interface 148. The operating system 145 includes executable instructions for managing applications and other host platform 102 operations. The operating system 145 can be, for example, UNIX®, Windows NT®, Linux®, or any other operating system.

In one embodiment, host platform 102 executes a backup framework engine 143 to help implement backup functions. In some embodiments, the backup framework engine 143 includes a VSS (Volume Shadow Services) layer, a processor executable module provided by Microsoft Corporation. The VSS layer is used by the operating system 145 to take snapshots of various VMs, as described below in detail. The snapshots taken by VSS are different from the snapshots taken by the storage system 108 via a back-up request forwarded by plug-in 136a via the storage system interface 150. The storage operating system 107 of storage system 108 generates one or more images relating to the file system to backup all or a portion of the file system e.g., a single data container, multiple data containers and/or one or more volumes.

After the backup is performed, the storage operating system 107 notifies plug-in module 136a that the backup operation is completed. For each backup, the storage system 108 also generates backup information that is forwarded by plug-in 136a to centralized module 126 via host services module 138 and then stored at data structure 130. The backup information may be in the form of metadata, and may include information about a backup, for example, identification for the backup, a time stamp when the backup was performed, and filenames, directory locations on the storage device(s) 114, and/or the directory path where backups are stored. The backup information may be used later to restore the file system and/or portions thereof, for instance, in case of a system crash, data corruption, virus, or a similar occurrence.

Because all the backup information is stored by the centralized module 126 at data structure 130, the information is easy to access and secure. This allows one to efficiently perform a restore operation because centralized module 126 maintains data structure 130 with all the backup information and can easily access it when the backup information is needed for a restore operation.

The plug-in 136a interfaces with VMM 106 for reporting events in system 100 and other operations, as described below in more detail. Plug-in 136a includes an event manager 142 for managing events, according to one embodiment. Event manager 142 interfaces with an OS management interface 141 described below in detail.

Event manager 142 maintains a queue 142a for storing event notifications that are received by OS management interface 141. In one embodiment, queue 142a stores a data structure that includes information regarding whether a VM is added, removed or modified. As an example, queue 142a may store a table that identifies an event, an affected VM and an indicator indicating if a VM is added, removed or modified. The processes for managing event notifications are described below in more detail. Plug-in 136a may also include a cluster co-coordinator 146 that interfaces with a cluster to obtain cluster related information.

The storage system interface 150 may be configured to act as an interface between various host platform 102 components and the storage system 108. The storage system interface 150 may communicate with the storage system 108 by using, for example, a Zephyr Application and Programming Interface (ZAPI) protocol. In particular, the storage system interface 150 interacts with the plug-in 136a and backup frame work engine 143 to receive and perform requests by interacting with other programs of host platform 102 or the storage system 108.

In some embodiments, the storage system interface 150 includes SnapDrive® (without derogation of trademark rights of NetApp Inc.), a program provided by NetApp Inc. of Sunnyvale, Calif. It is noteworthy that the adaptive embodiments described herein are not limited to using SnapDrive®, any other module may be used for interfacing with the storage operating system.

Figure 1C:
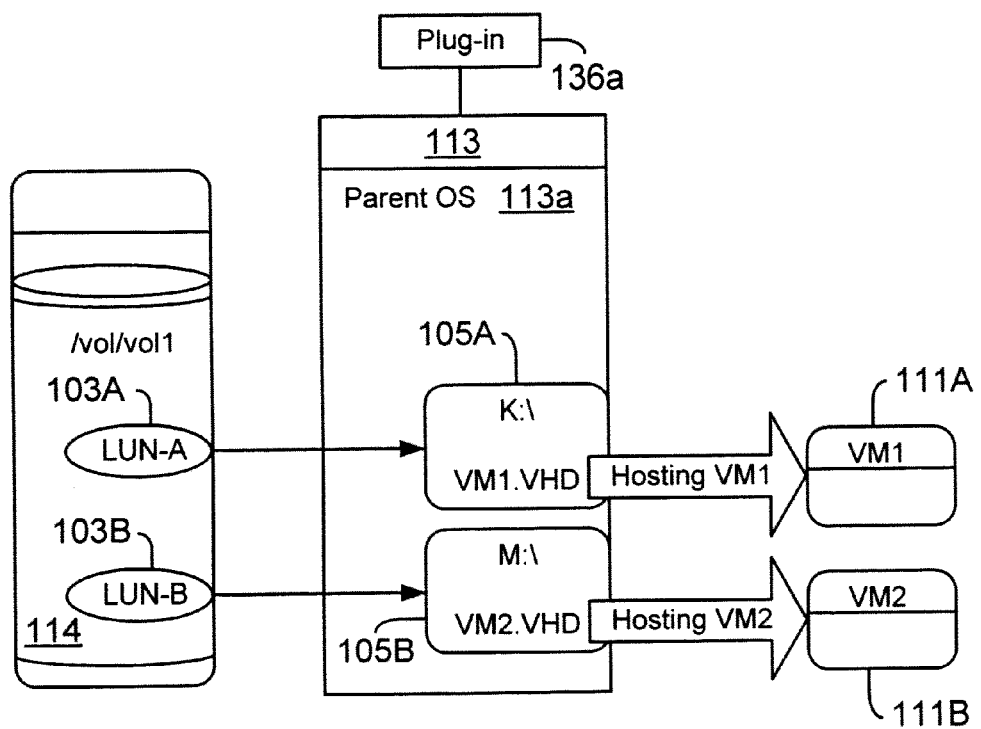
FIG. 1C shows an example of presenting storage to a virtual machine, according to one embodiment.

FIG. 1C shows an example of a Hyper-V server 113 (similar to platform 102) provided in a Microsoft Corporation virtual server environment that interfaces with plug-in 136a. The plug-in 136a performs and/or assists in various functions that are described below.

The hyper-V server 113 executes an operating system 113a, referred to as a parent operating system that hosts a plurality of VMs 111a-111b, similar to VMs 105a-105n. Storage operating system 107 presents storage space to the parent operating system 113a as LUNs, for example, 103a and 103b. The parent operating system 113a generates a virtual hard drive (VHD) file for the presented LUNs, for example, VM1-VHD 105a is the VHD file for LUN 103a and VHD file 105b is for LUN 103b. The VHD files appear as a storage drive to a user using the VMs. For example, VHD file 105a appears as K:\ to VM 111A and VHD 105B appears as M:\ drive to VM 111B. LUNs 103a and 103b are typically replicated by the storage system 108, while drives 105a and 105b may be replicated by backup framework engine 143 using VSS.

Figure 1D:
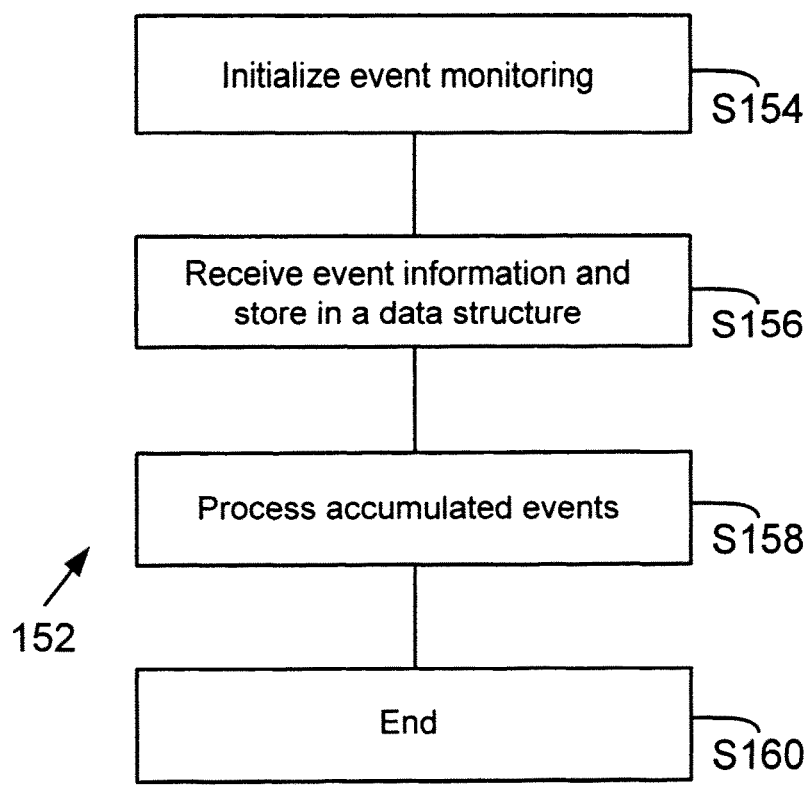
FIG. 1D-FIG. 1F and FIG. 1H show process flow diagrams of the various embodiments.

Process Flow:

FIG. 1D shows a process flow diagram 152 for handling events that occur in system 100, according to one embodiment. The process begins in block 3154, when the event manager 142 of plug-in 136a is initialized. In block S156, event related information is received by event manager 142 and stored at event queue 142a. As an example, an event may be when a VM is added, removed or modified. A VM is added when VMM 106 presents a VM to a user. A VM is removed when VMM 106 ends a VM session and it is no longer available to a user. A VM may be considered modified when a VM is turned on or off by a user.

The event information may be received by plug-in 136a from OS management interface 141 that maintains a data structure (not shown) within the operating system 145. The data structure identifies each VM with a unique identifier and may store an indicator indicating when a VM is added, removed or modified. As an example, OS management interface 141 may include a Windows Management Instrumentation (WMI) module in a Windows (without derogation of any trademark rights of Microsoft Corporation) Operating system environment. WMI provides a standard methodology for sharing management information. WMI maintains a data structure having objects with details regarding various VMs and other events. It is noteworthy that the embodiments disclosed herein are not limited to the WMI module that collects event information and then provides it to event manager 142 of plug-in 136*a*.

In block S158, the events are processed, as described below with respect to the process flow diagram of FIG. 1E and thereafter, the process ends in block S160.

Figure 1E:
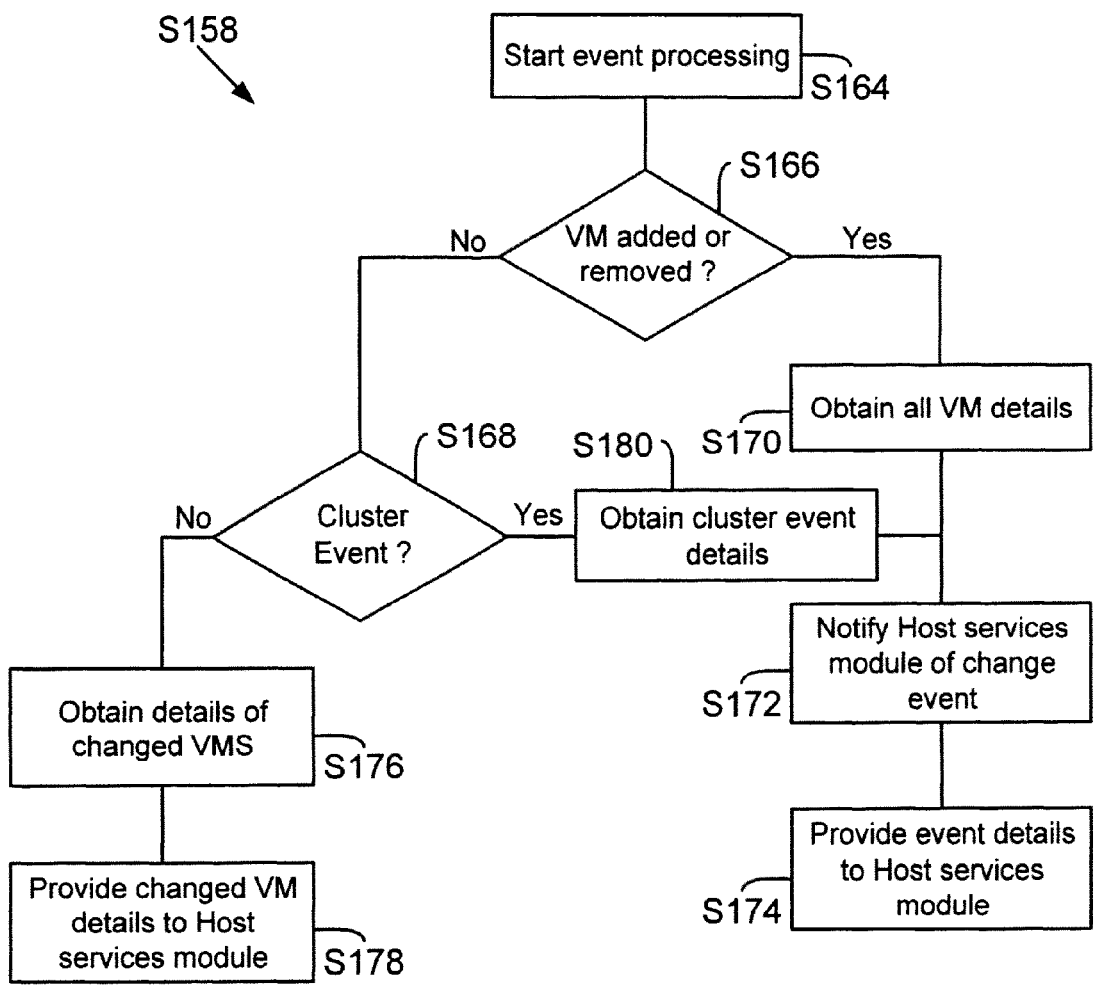

FIG. 1E shows a process flow diagram for block S158 of FIG. 1O, according to one embodiment. The event processing begins in block S164. In block S166, plug-in engine 140 reviews event information at queue 142*a* and determines if a VM has been added or removed. This determination is made by reviewing a data structure (not shown) that stores event details and indicates whether a VM has been added or removed.

If a VM is added or removed, then the process moves to S170, where all VM details are obtained by event manager 142 via storage system interface 150. In one embodiment, storage system interface 150 may first collect VM information from OS management interface 141. This may include VM identifier information and any other information that is maintained by OS management interface 141. Storage system interface 150 may also request information from storage system 108. This may include information regarding where VM files may be stored by storage system 108. Storage system interface 150 then provides the VM details to event manager 142.

Plug-in engine 140 then notifies host services module 138 via host services interface 144 that a change event has occurred in step S172. The host services module 138 notifies the centralized module 126 of the changed event. If the centralized module 126 requests details regarding the change event, then in block S174, plug-in engine 140 provides the VM details collected in block S170 to the host services module 138 and then to centralized module 126 that stores the details at data structure 130.

Referring back to block S166, if a VM is not added or removed, then the process moves to block S168. During block S168, plug-in engine 140 determines if there is a cluster related event. An example of a cluster related event is, when a cluster node is taken off-line or is initialized and comes on-line.

If a cluster event occurred, then in block S180, plug-in 136*a* obtains cluster details via the cluster co-coordinator 146 that communicates with the various cluster nodes via host interface 144. The cluster information may include the identity of the various cluster nodes and information regarding the VMs that are operating within each cluster node. The process then moves to block S172 that has been described above.

If there is no cluster related event as determined in block S168, the process moves to block S176 where plug-in 136*a* obtains details regarding any VMs that may have changed. Plug-in 136*a* obtains the information regarding changed VMs from VMM 106 that manages all the VMs and/or OS management interface 141. Thereafter, the changed VM details are sent to host services module 138 via host services interface 144, in block S178. The information is provided to centralized module 126 by the host services module 138 and stored at data structure 130.

The embodiments disclosed herein have numerous advantages. For example, event information and notification is consolidated so that the management console 118 does not have to be notified after every change within system 100. This is efficient and saves computing resources, while reducing overall interruption within system 100.

Figure 1F:
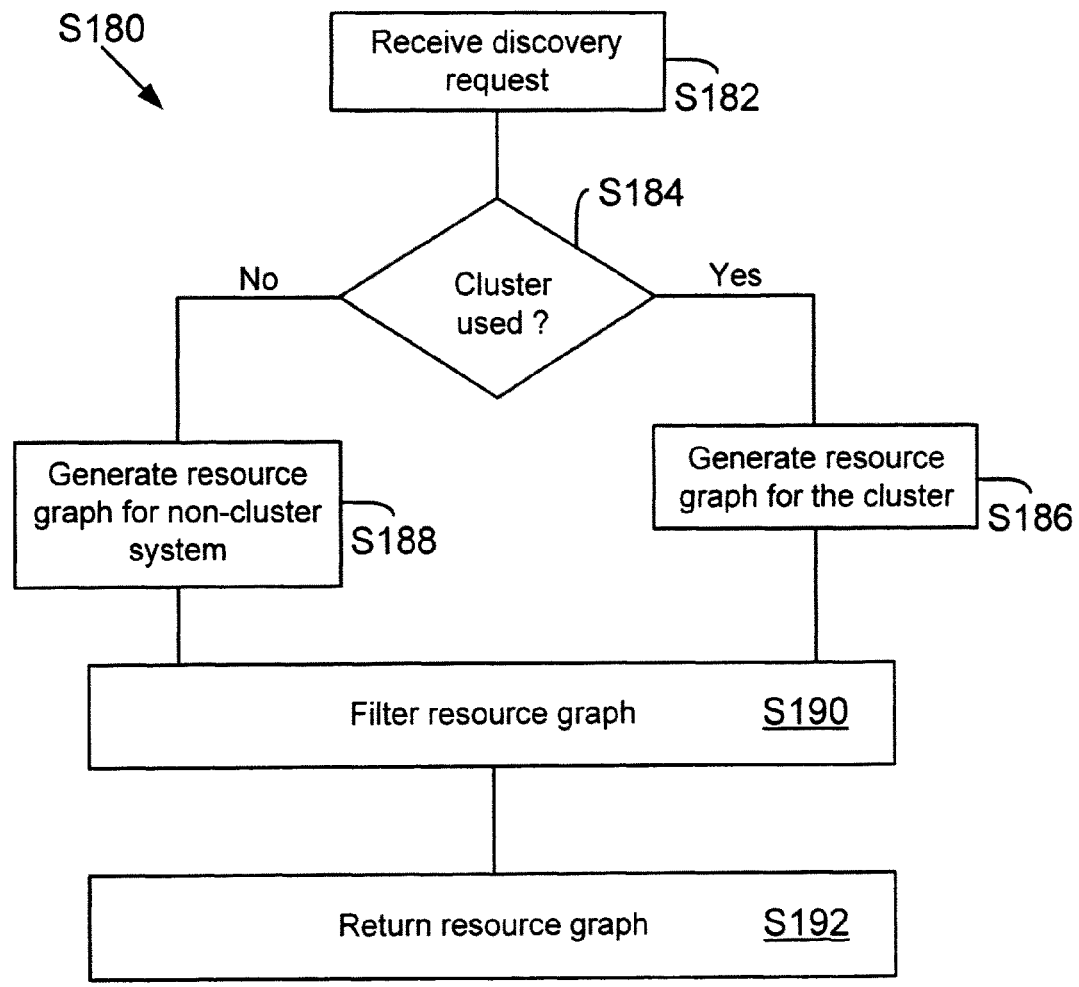

FIG. 1F shows a process flow diagram for discovering resources, for example, VMs, in system 100, according to one embodiment. The process 180 begins in block S182 when a discovery request is received by plug-in 136*a*. The request may be received via the discovery request API 138*b*. The request may be generated by management application 117, client 116 or any other module. The discovery request may specify what information is needed. For example, the request may want to see details regarding all the VMs within system 100.

Figure 1G:
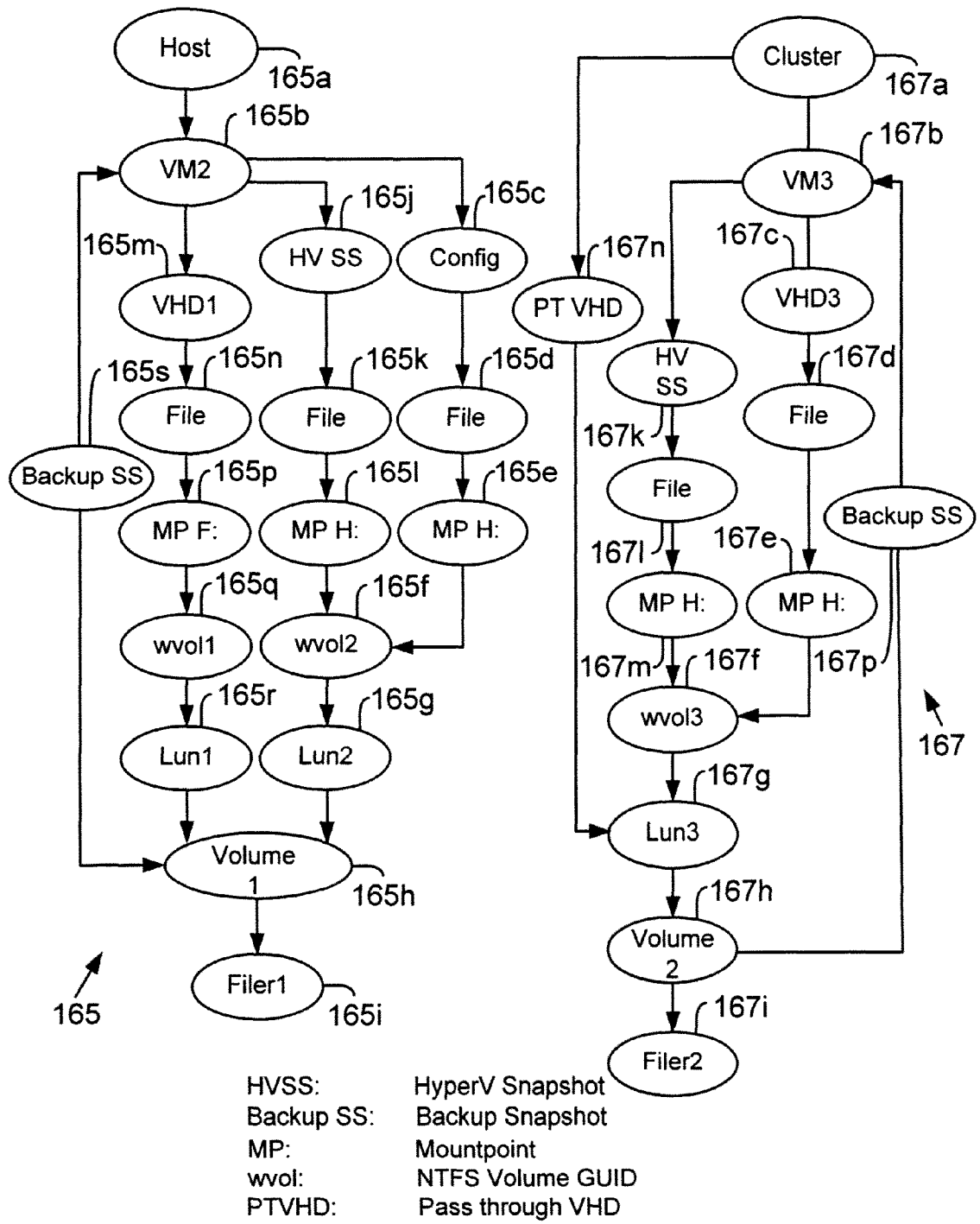
FIG. 1G shows an example of a resource data structure generated according to one embodiment.

After the request is received, in block S184, plug-in engine 140 determines if the request pertains to a cluster. Plug-in engine 140 is able to identify a cluster if the request specifies a unique identifier identifying the cluster. Plug-in engine 140 may access a data structure (not shown) maintained by cluster co-coordinator 146 to verify if a cluster is being used. If a cluster is involved, then in block S186, plug-in engine 140 obtains details regarding the cluster. The details are obtained by cluster coordinator 146 via host services interface 144. A resource data structure (may also be referred to as resource graph) is then generated by plug-in engine 140. An example of the cluster resource data structure 167 is shown in FIG. 1G and is described below in more detail.

If a cluster is not being used, as determined in block S184, the process moves to block S188 when a resource data structure for a non-cluster based system is generated by plug-in engine 140. The details regarding storage system 108 and the VMs are obtained via storage system interface 150. An example of a resource data structure 165 is also provided in FIG. 1G and described below in more detail.

The resource data structures generated in blocks S186 and S188 are filtered in block S190. The filtering process is based on parameters specified in the discovery request received in block S182. For example, a request may specify that a user wants the identity of the storage systems associated with a VM. Plug-in 136*a* obtains the identity of the storage systems from the resource data structure. The filtered results are returned to the requester in block S192 via the host services module 138 and the centralized module 126.

In one embodiment, resource data structures generated by plug-in 136*a* may be stored as part of data structure 130. In this case, centralized module 126 is able to provide resource information to a user efficiently because it maintains data structure 130. A user simply has to request information from centralized module 126 and the information is easily provided using data structure 130. The underlying resource information is collected and generated by plug-in 136*a*, as described above.

FIG. 1G shows an example of a resource data structure 165 and 167, according to one embodiment. Plug-in module 136*a* maintains a data structure at a memory location for generating the resource data structures. The resource data structures provide a hierarchical, tree-like structure showing details of various components associated with the VMs, for example, the VHDs, backup copies, the LUNs, storage systems and others.

Host 102 is identified as host 165*a* in resource data structure 165. The virtual machine VM2 is shown as 165*b*. The configuration information for VM2 is shown as Config 165*c* stored in a data structure shown as file 165*d*. The file 165*d* is stored at a drive shown as MP H: 165*e* that is identified by a uniform global identifier shown as wvol2 165*f* associated with a LUN shown as LUn2 165*g*. LUN2 165*g* belongs to Volume I 165*b* which is managed by storage system 108 shown as Filer 1 165*i*.

VM2 165*b* is presented a virtual hard drive VHD1 165*m* as a data structure shown as File 165*n*. File 165*n* presents a drive MP F: 165*p* to VM2 identified by wvol1 165*q* associated with Lun1 165*r*. LUN1 165*r* is also a part of Volume 1 165*h* that is managed by Filer 1 165*i* (for example, storage system 108).

VM2 165*b* may be replicated by the operating system backup framework engine 143 and the replicated copy is shown as 165*j*. The replicated copy is represented by a data container shown as file 165*k* stored at MP H: 165*l* identified by wvol2 165*f* which in turn is associated with LUN2 165*g* located in Volume 1 165*h* and managed by Filer 1 165*i*. The replicated copy of Volume 1 that is taken by Filer 1 165*i* is shown as Backup SS 165*s*, where SS stands for snapshot.

The resource data structure 165 may be traversed to obtain any information that may be requested by a discovery request. For example, if a request desires storage system identifier information for VM2 165*b*, then plug-in 136*a* traverses through the resource data structure 165 and obtains filer1 165*i* identifier and presents the requested information. By maintaining the resource data structure as a searchable data structure, plug-in 136*a* can respond to different requests efficiently.

In one embodiment, the resource data structure 167 is for a cluster of host platforms 102 identified as cluster 167*a*. The virtual machine associated with cluster 167*a* is shown as VM3 167*b* that is presented as a virtual hard disk shown as VHD3 167*c*. The file associated with VHD3 is shown as 167*d* that is stored at MP H: 167*e* identified by wvol3 167*f* and LUN3 167*g*. LUN3 167*g* is a part of Volume 2 167*h* which is managed by storage system 167*i* shown as Filer2. A pass through VHD is shown as 167*n* that is also associated with LUN3 167 VHD typically includes a file system for example, a NTFS file system. A pass through VHD (PTVHD) is presented to a VM by a parent operating system directly as a LUN without a file system. The VM may then add a file system.

The backup copy of VM3 as taken by operating system backup framework engine 143 is shown as HVSS 167*k* that is associated with a data container shown as File 1671. File 1671 is stored at MP H: 167*m* identified by wvol3 167*f*, which in turn is associated with LUN3 167*g*. LUN3 167*g* is a part of Volume 2 managed by Filer2 167*i*. The replicated copy of Volume 2 167*h* is shown as Backup SS 167*p*.

The resource data structures shown above may be used by a user, for example, an administrator to view virtual machine details including configuration information. The administrator is easily able to determine the location of the various data structures associated with the VMs. This allows the administrator to change the configuration information or restore a VM using a backup copy. The administrator does not have to determine any of the location information because it is conveniently presented in the searchable tree-like graphical resource data structure.

Figure 1H:
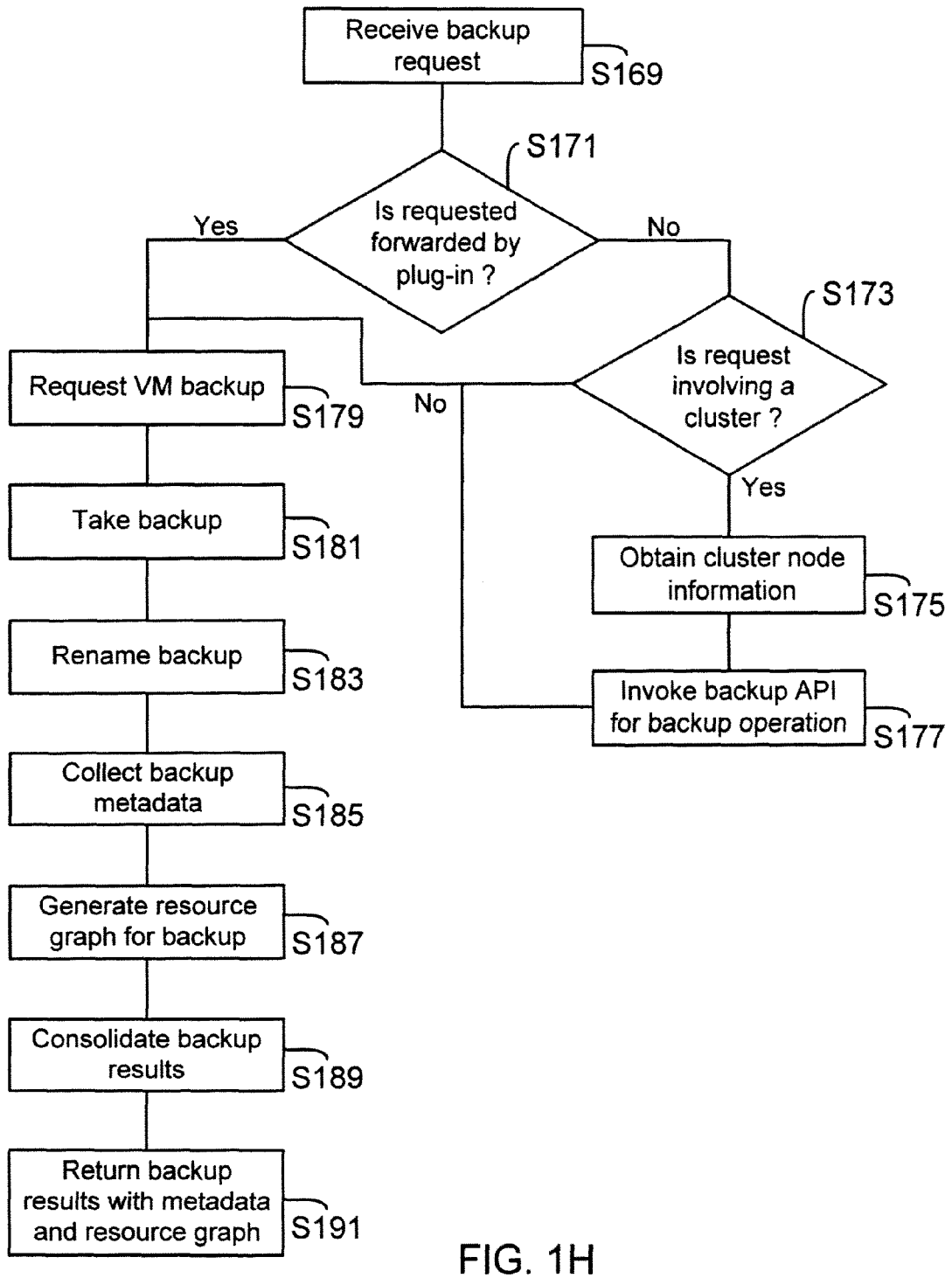

FIG. 1H shows a process flow diagram for performing a replication operation using plug-in 136*a* and other modules system 100, according to one embodiment. The process begins in block S169 when a backup or replication request is received. The backup request may be generated via management console 118, client system 116, a backup application executed by a parent OS 113 or any other module, including plug-in module 136*a* that may forward a backup request. The request may be to backup a VM or multiple VMs. The request is received by host services backup API 138*c*.

In block S171, plug-in engine 140 determines if the request was forwarded by plug-in module 136*a* itself, as explained below. The host services backup API 138*c* makes this determination by evaluating the request and determining if an indicator, for example, a flag, is set for a forwarded request. If the request is not forwarded by plug-in module 136*a*, then the process moves to block S173, when plug-in engine 140 determines if the request involves a cluster of host platforms 102. This is determined by evaluating the request and determining if a cluster is identified in the request.

If a cluster is identified, then in block S175, plug-in engine 140 determines the nodes (i.e. host platform 102) that are associated with the VMs. Plug-in engine 140 makes this determination using cluster coordinator 146 that obtains cluster information via host services interface 144.

In block S177, plug-in engine 140 invokes the backup API 138*a* for the backup operation and the process moves to block S179. Plug-in 136*a* may also tag a request as being a forwarded request in block S177. For example, if there are a plurality of parent operating systems each managing one or more VMs, after the request is received, it may have to cycle through the parent operating systems to replicate all the VMs. Plug-in 136*a* in this case may insert a flag indicating that the request is being forwarded.

Referring back to blocks S171 and S173, if the request is forwarded, or if does not involve a cluster, then in block S179, plug-in module 136*a* sends a backup request to OS backup framework engine 143 via the operating system interface 148. The request identifies which VMs are to be replicated.

In block S181, one or more VMs are backed up by the OS backup framework engine 143. For example, in a Windows operating environment, the VSS takes a snapshot of the VM. The snapshots are renamed in block S183 based on the backup request received in block 5169. The plug-in engine 140 collects meta-data for the backups in block S185. The meta-data is received from the operating system backup framework engine 143 that performs the backup. The meta-data includes information for example, identification for the backup, a time stamp when the backup was performed, and filenames, directory locations on the storage device(s) 114, and/or the directory path where backups are stored.

In block S187, a resource data structure described above with respect to FIG. 1E is generated. The backup results are consolidated in block S189. For example, if a cluster is involved, plug-in engine 140 consolidates the results for multiple hot platforms 102.

In block S191, the plug-in module 136*a* returns the backup results, the resource data structures and the meta-data are sent to the requester via host services backup API 138*c*. The backup information is forwarded to centralized module 126 and stored as data structure 130.

The backup process of FIG. 1H has various advantages. For example, the resource data structure is made available to centralized module 126. This allows the centralized module 126 to efficiently process any requests to restore a VM using the resource data structure because centralized module has access to all the relevant information regarding all the backups, including location information.

Figure 2:
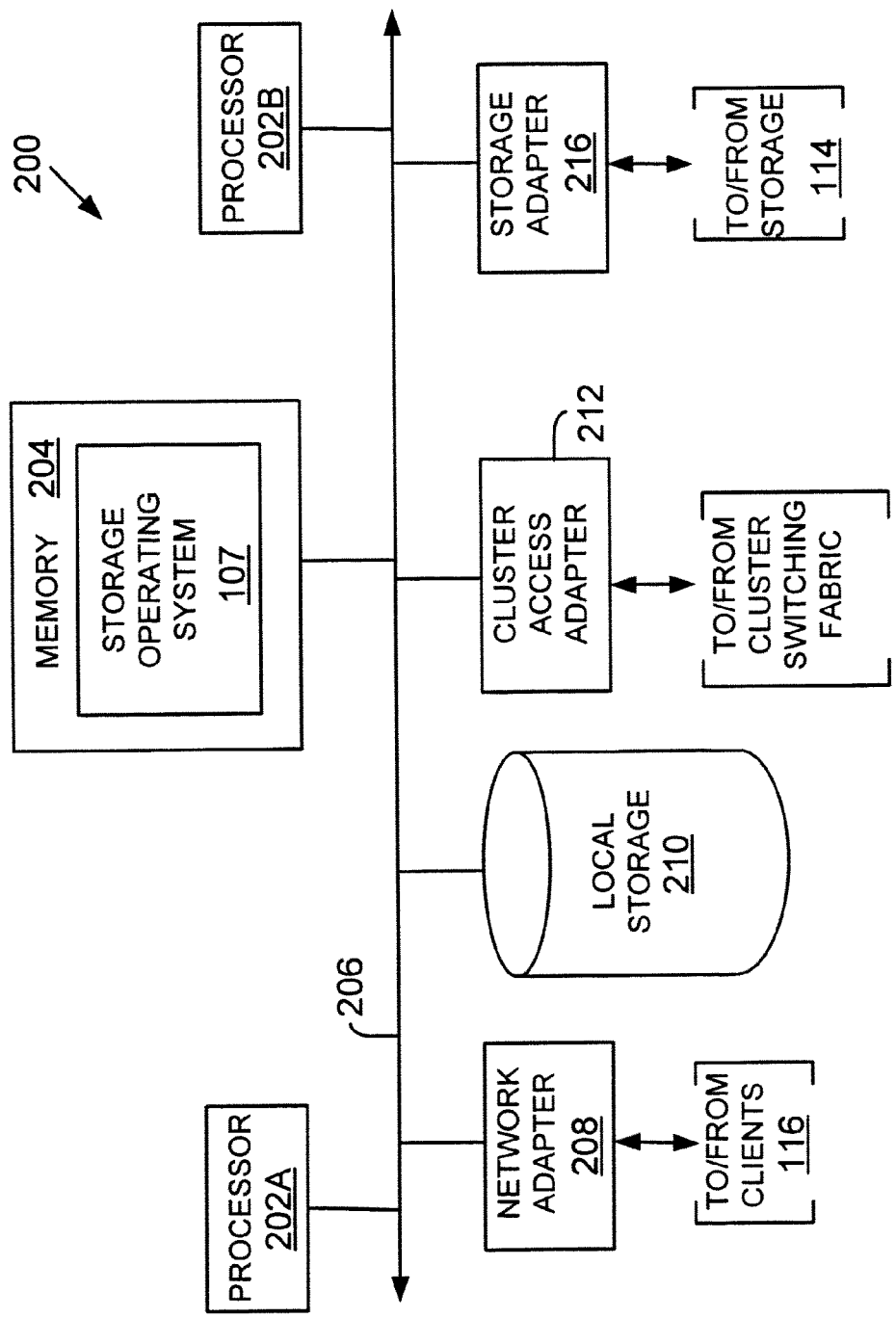
FIG. 2 shows an example of a storage system, used according to one embodiment.

Storage System:

FIG. 2 is a block diagram of a system 200, according to one embodiment. System 200 may be used by a stand-alone storage system 108 and/or a storage system node operating in a distributed storage environment (for example, a storage cluster system).

System 200 may include a plurality of processors 202A and 202B, a memory 204, a network adapter 208, an access adapter 212 (used for a distributed storage environment) storage adapter 216 and local storage 210 interconnected by a system bus 206. The local storage 210 comprises one or more storage devices, such as disks, utilized by the processors to locally store configuration and other information.

The access adapter 212 comprises a plurality of ports adapted to couple system 200 to other nodes of a distributed storage environment (not shown). In the illustrative embodiment, Ethernet may be used as the protocol and interconnect media, although it will be apparent to those skilled in the art that other types of protocols and interconnects may be utilized within the distributed storage environment.

System 200 is illustratively embodied as a dual processor storage system executing a storage operating system 107 that preferably implements a high-level module, such as a file system, to logically organize information as a hierarchical structure of named directories, files and special types of files called virtual disks (hereinafter generally "blocks") on storage devices 114. However, it will be apparent to those of ordinary skill in the art that the system 200 may alternatively comprise a single or more than two processor systems. Illustratively, one processor 202 executes the functions of an N-module on a node, while the other processor 202B executes the functions of a D-module.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 107, portions of which is typically resident in memory and executed by the processing elements, functionally organizes the system 200 by, inter alia, invoking storage operations in support of the storage service provided by storage system 108. An example of operating system 107 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple the system 200 to one or more clients 116 over point-to-point links, wide area networks, virtual private networks implemented over a public network (Internet) or a shared local area network. The network adapter 208 thus may comprise the mechanical, electrical and signaling circuitry needed to connect storage system 108 to the network. Illustratively, the computer network 207 may be embodied as an Ethernet network or a FC network.

The storage adapter 216 cooperates with the storage operating system 107 executing on the system 200 to access information requested by the clients and management application 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to the disks over an I/O interconnect arrangement, such as a conventional high-performance, FC link topology. In another embodiment, instead of using a separate network and storage adapter, a converged adapter is used to process both network and storage traffic.

Figure 3:
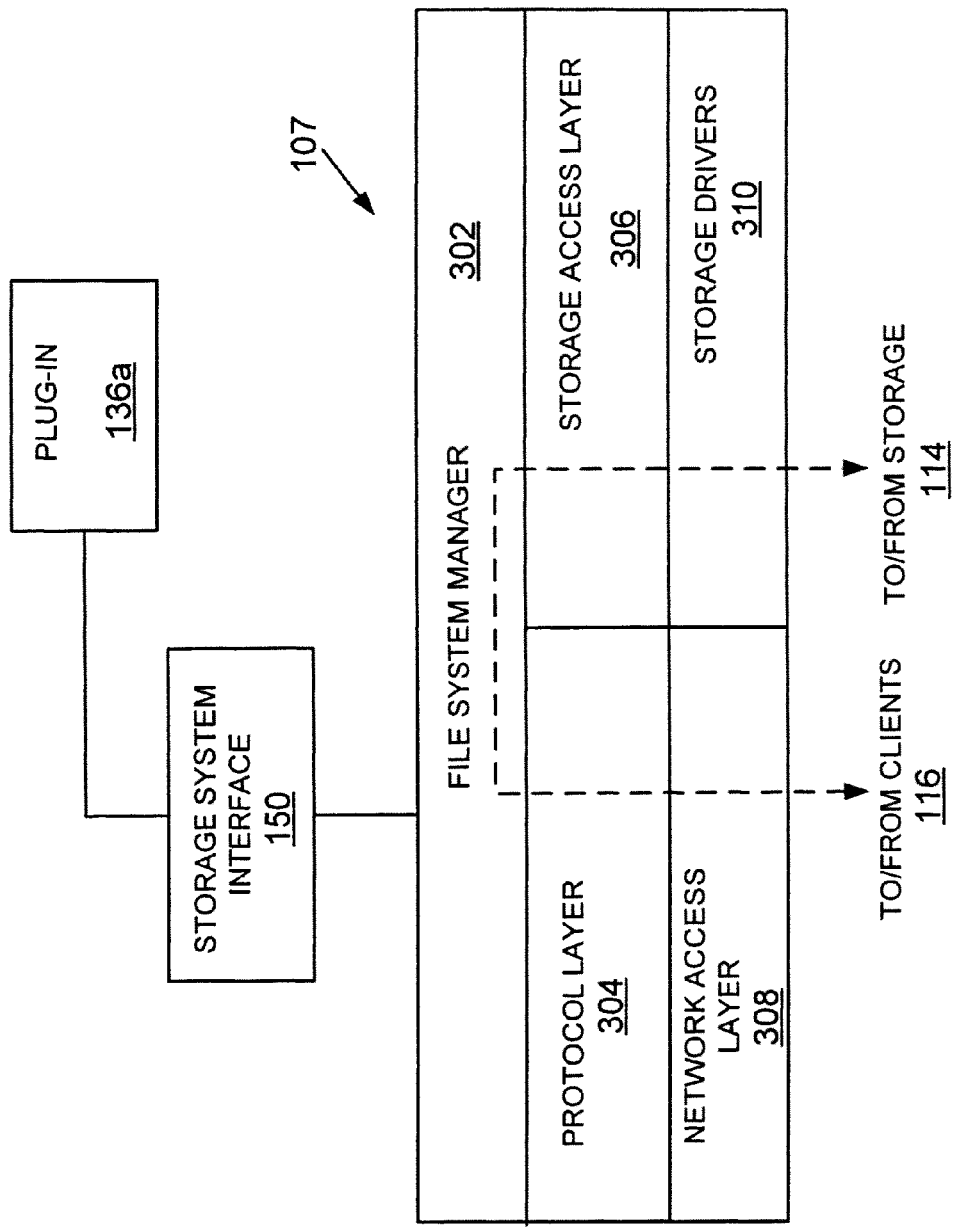
FIG. 3 shows an example of an operating system, used according to one embodiment.

Operating System:

FIG. 3 illustrates a generic example of operating system 107 executed by node 202 or storage system 108, according to one embodiment of the present disclosure. Storage operating system 107 interfaces with storage system interface 150 and hence Plug-in 136a for providing information according to the process blocks described above.

In one example, operating system 107 may include several modules, or "layers". These layers include a file system manager 302 that keeps track of a directory structure (hierarchy) of the data stored in storage devices and manages read/write operations, i.e. executes read/write operations on disks in response to client 116 requests.

Operating system 107 may also include a protocol layer 304 and an associated network access layer 308, to allow system 200 to communicate over a network with other systems, such as host platform 102, clients 116 and management application 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between clients 116 and mass storage devices 114 are illustrated schematically as a path, which illustrates the flow of data through operating system 107.

The operating system 107 may also include a storage access layer 306 and an associated storage driver layer 310 to allow system 200 to communicate with a storage device. The storage access layer 306 may implement a higher-level disk storage protocol, such as RAID (redundant array of inexpensive disks), while the storage driver layer 310 may implement a lower-level storage device access protocol, such as FC or SCSI.

It should be noted that the software "path" through the operating system layers described above needed to perform data storage access for a client request received at node 102 may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by system 200 in response to a file system request issued by client 114.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
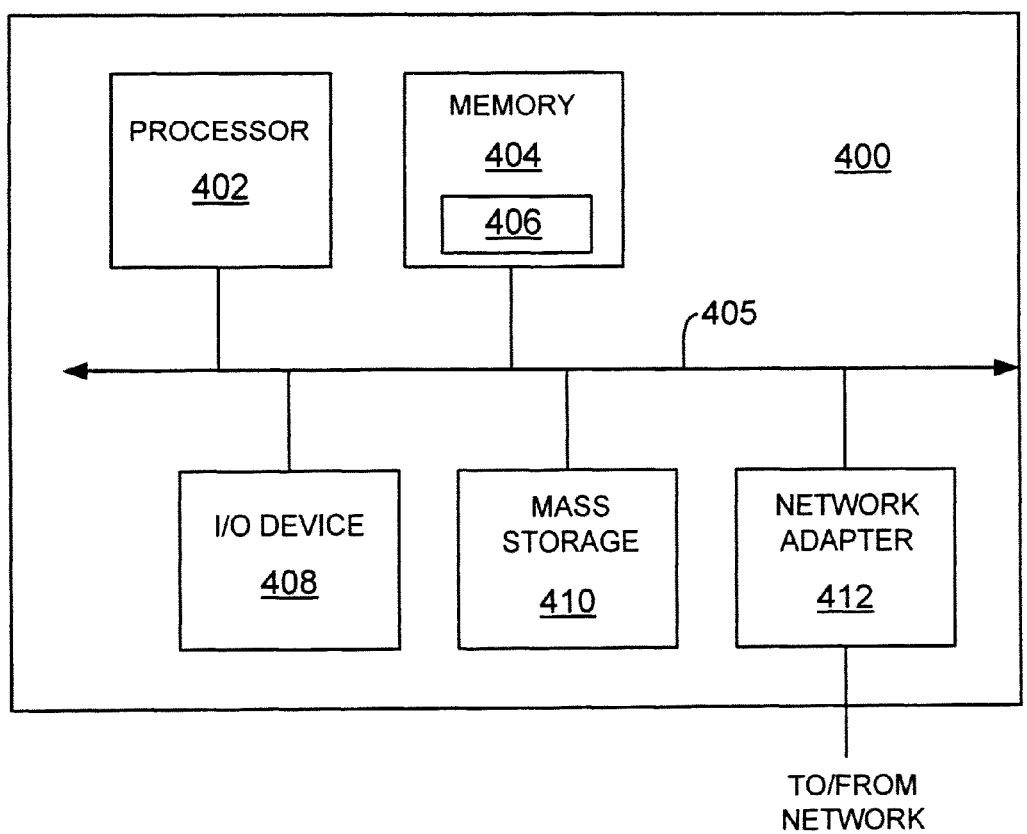
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent management console 118, clients 116, host platform 102, storage system 108, centralized module 126, a host services module 138 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. Instructions 406 may include executable instructions for plug-in 136*a*-136*n*, host services APIs 138*a*-138*n*, code for executing process steps of FIGS. 1D-1F and 1H and other instructions.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The plug-in module 136*a* and the storage systems described above can be a part of the server layer for providing storage services. Details regarding these layers are not germane to the inventive embodiments.

Thus, a method and apparatus for providing storage services using a plug-in have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method comprising:
   maintaining a queue for storing information related to any event related to any of a plurality of virtual machines; wherein a plug-in application that interfaces with a processor executable host services module, a storage operating system for a storage system with a plurality of storage devices and an operating system of a computing system executing the plurality of virtual machines in a storage operating environment with access to storage space at the storage devices, maintains the queue based on information obtained from the operating system of the computing system and the storage operating system;
   collecting information regarding the plurality of virtual machines in the storage operating environment; wherein the plug-in application collects the information from the operating system of the computing system and the storage operating environment and stores the information at the queue;

generating a data structure for illustration of a hierarchical structure showing details associated with each of the plurality of virtual machines, including a configuration file for each virtual machine with a path indicating where the configuration file is stored, a virtual storage device associated with each of the plurality of virtual machines with a path for a data structure associated with the virtual storage device indicating where the virtual storage device is stored; a replicated copy of the plurality of virtual machines with a location map showing where the replicated copy is stored and a replicated copy of a storage volume generated by a storage system executed within the storage operating environment;

detecting if a change event has occurred based on the collected information;

wherein the change event occurs when a virtual machine is added, modified or removed within a certain duration; and wherein the virtual machine is added when the operating system presents the virtual machine to a user; the virtual machine is modified when the virtual machine is powered on or off by the user; and the virtual machine is removed when the operating system ends a session for the virtual machine and the virtual machine becomes unavailable to the user;

notifying the processor executable host services module of the change event in the storage operating environment based on whether the virtual machine was added, modified or removed; wherein the plug-in application notifies the processor executable host services module; and providing information regarding the plurality of virtual machines to the processor executable host services module, when requested using the data structure for the hierarchical structure; wherein the plug-in application forwards the information to the processor executable host services module.

2. The method of claim 1, wherein the storage operating environment includes a centralized module interfacing with a management console and with the processor executable host services module for providing the information regarding the virtual machines to the management console.

3. The method of claim 1, wherein the processor executable host services module includes a plurality of modules for providing certain services using the plug-in application.

4. The method of claim 3, wherein the processor executable host services module includes a module for reporting the information regarding the virtual machines to a centralized module.

5. The method of claim 3, wherein the processor executable host services module includes a module for discovering the plurality of virtual machines within the storage operating environment.

6. The method of claim 3, wherein the processor executable host services module includes a module that assists replicating one or more of the virtual machines using the plug-in application.

7. A non-transitory, machine readable storage medium storing executable instructions, which when executed by a machine, causes the machine to perform a method, the method comprising:

maintaining a queue for storing information related to any event related to any of a plurality of virtual machines; wherein a plug-in application that interfaces with a processor executable host services module, a storage operating system of a storage system having a plurality of storage devices and an operating system of a computing system executing the plurality of virtual machines in a storage operating environment with access to storage space at the storage devices, maintains the queue based on information obtained from the operating system of the computing system and the storage operating system;

collecting information regarding the plurality of virtual machines in the storage operating environment;

wherein the plug-in application collects the information from the operating system of the computing system and the storage operating environment and stores the information at the queue;

generating a data structure for illustration of a hierarchical structure showing details associated with each of the plurality of virtual machines, including a configuration file for each virtual machine with a path indicating where the configuration file is stored, a virtual storage device associated with each of the plurality of virtual machines with a path for a data structure associated with the virtual storage device indicating where the virtual storage device is stored; a replicated copy of the plurality of virtual machines with a location map showing where the replicated copy is stored and a replicated copy of a storage volume generated by the storage system executed within the storage operating environment;

detecting if a change event has occurred based on the collected information;

wherein the change event occurs when a virtual machine is added, modified or removed within a certain duration; and wherein the virtual machine is added when the operating system presents the virtual machine to a user; the virtual machine is modified when the virtual machine is powered on or off by the user; and the virtual machine is removed when the operating system ends a session for the virtual machine and the virtual machine becomes unavailable to the user;

notifying the processor executable host services module of the change event in the storage operating environment based on whether the virtual machine was added, modified or removed;

wherein the plug-in application notifies the processor executable host services module; and providing information regarding the plurality of virtual machines to the processor executable host services module, when requested using the data structure for the hierarchical structure;

wherein the plug-in application forwards the information to the processor executable host services module.

8. The storage medium of claim 7, wherein the storage operating environment includes a centralized module interfacing with a management console and with a host services module for providing the filtered representation to the management console.

9. The storage medium of claim 7, wherein the processor executable host services module includes a plurality of modules for providing certain services using the plug-in application.

10. The storage medium of claim 9, wherein the processor executable host services module includes a module for reporting the information regarding the virtual machines to a centralized module.

11. The storage medium of claim 9, wherein the processor executable host services module includes a module for discovering the plurality of virtual machines within the storage operating environment.

12. The storage of claim 9, wherein the processor executable host services module includes a module that assists replicating one or more of the virtual machines using the plug-in application.

13. A system, comprising:
- a processor for a computing system executing an operating system and a plurality of virtual machines in a storage operating environment;
- a processor for a storage system having a plurality of storage devices executing a storage operating system; and
- a plug-in application that interfaces with a processor executable host services module, the storage operating system and the operating system of the computing system executing the plurality of virtual machines with access to storage space at the storage devices;

wherein the plug-in application:
- maintains a queue for storing information related to any event related to any of the plurality of virtual machines based on information obtained from the operating system of the computing system and the storage operating system;
- collects information regarding the plurality of virtual machines from the operating system of the computing system and stores the information at the queue;
- generates a data structure for illustration of a hierarchical structure showing details associated with each of the plurality of virtual machines, including a configuration file for each virtual machine with a path indicating where the configuration file is stored, a virtual storage device associated with each of the plurality of virtual machines with a path for a data structure associated with the virtual storage device indicating where the virtual storage device is stored; a replicated copy of the plurality of virtual machines with a location map showing where the replicated copy is stored and a replicated copy of a storage volume generated by the storage system executed within the storage operating environment;
- detects if a change event has occurred based on the collected information;
- wherein the change event occurs when a virtual machine is added, modified or removed within a certain duration; and
- wherein the virtual machine is added when the operating system presents the virtual machine to a user; the virtual machine is modified when the virtual machine is powered on or off by the user; and the virtual machine is removed when the operating system ends a session for the virtual machine and the virtual machine becomes unavailable to the user;
- notifies the processor executable host services module of the change event in the storage operating environment based on whether the virtual machine was added, modified or removed; wherein the plug-in application notifies the processor executable host services module; and
- provides information regarding the plurality of virtual machines to the processor executable host services module, when requested using the data structure for the hierarchical structure, wherein the plug-in application forwards the information to the processor executable host services module.

14. The system of claim 13, wherein the storage operating environment includes a centralized module interfacing with a management console and the processor executable host services module for providing the information regarding the virtual machines to the management console.

15. The system of claim 13, wherein the processor executable host services module includes a plurality of modules for providing certain services using the plug-in application.

16. The system of claim 15, wherein the processor executable host services module includes a module for reporting the information regarding the virtual machines to a centralized module.

17. The system of claim 15, wherein the processor executable host services module includes a module for discovering the plurality of virtual machines within the storage operating environment.

18. The system of claim 15, wherein the processor executable host services module includes a module that assists replicating one or more of the virtual machines using the plug-in application.

* * * * *